(12) United States Patent
Chiu et al.

(10) Patent No.: US 11,953,614 B2
(45) Date of Patent: Apr. 9, 2024

(54) METHOD FOR MEASURING COORDINATE POSITION AND PORTABLE ELECTRONIC DEVICE USING THE SAME

(71) Applicant: GETAC TECHNOLOGY CORPORATION, New Taipei (TW)

(72) Inventors: Chia-Chang Chiu, Taipei (TW); Wei-Rong Chen, Taipei (TW)

(73) Assignee: Getac Technology Corporation, New Taipei (TW)

( * ) Notice: Subject to any disclaimer, the term of this patent is extended or adjusted under 35 U.S.C. 154(b) by 63 days.

(21) Appl. No.: 17/520,586

(22) Filed: Nov. 5, 2021

(65) Prior Publication Data

US 2023/0142513 A1 May 11, 2023

(51) Int. Cl.
  *G01S 5/02* (2010.01)
  *G01S 5/06* (2006.01)
  *H04W 4/02* (2018.01)

(52) U.S. Cl.
  CPC .......... *G01S 5/0284* (2013.01); *G01S 5/0257* (2013.01); *G01S 5/06* (2013.01); *H04W 4/023* (2013.01)

(58) Field of Classification Search
  CPC ........ G01S 5/0284; G01S 5/0257; G01S 5/06; H04W 4/023
  See application file for complete search history.

(56) References Cited

U.S. PATENT DOCUMENTS

| 7,295,296 B1 | 11/2007 | Galli |
| 2005/0057745 A1 | 3/2005 | Bontje |
| 2015/0355328 A1* | 12/2015 | Maryfield ............. G01C 17/00 356/8 |

FOREIGN PATENT DOCUMENTS

| CN | 104457736 A | * 3/2015 | ............. G01C 21/00 |
| CN | 105652303 A | * 6/2016 | |
| EP | 1734378 A2 | 12/2006 | |

OTHER PUBLICATIONS

European Patent Office, Search Report, Application No. 222024835, dated Mar. 31, 2023, Germany.

* cited by examiner

*Primary Examiner* — Umair Ahsan
(74) *Attorney, Agent, or Firm* — Han IP PLLC; Andy M. Han

(57) ABSTRACT

A method for measuring coordinate position include detecting the distance of a target relative to a portable electronic device to generate a measurement signal corresponding to the distance, sensing a relative position of the target to generate a azimuth angle corresponding to the relative position, detecting the movement of the portable electronic device to generate an inertial signal corresponding to the movement, obtaining positioning information of the portable electronic device, converting the measurement signal into distance data, converting the inertial signal into a tilt angle, calculating coordinate difference information with the tilt angle, the distance data and the azimuth angle, and calculating coordinate position of the target with the positioning information and the coordinate difference information.

12 Claims, 3 Drawing Sheets

METHOD FOR MEASURING COORDINATE POSITION AND PORTABLE ELECTRONIC DEVICE USING THE SAME

BACKGROUND OF THE INVENTION

Field of the Invention

The present disclosure relates to technology of measuring position information and, more particularly, to a method for measuring a coordinate position and a portable electronic device using the same.

Description of the Prior Art

Portable electronic devices nowadays mostly come with a positioning function to provide information about their current positions. Global positioning system (GPS) positioning is a technology typical of portable electronic devices nowadays. In addition to GPS positioning, positioning techniques, such as base station positioning and/or WIFI positioning, are applicable to some of the portable electronic devices.

To obtain information about the position of a location of interest or a target, users have to bring portable electronic devices to the location of interest or the target and obtain the information about the position of the location of interest or the target with the portable electronic devices. However, for reasons related to accessibility and/or contact restraint, some locations or targets might not be accessible. Therefore, it is necessary to provide a positioning technique to be carried out without users showing up at the locations or coming into contact with the targets.

SUMMARY OF THE INVENTION

In an embodiment, a portable electronic device comprises a processing unit, a range finding module, a position identifying module, an inertia sensing module and positioning unit. The processing unit is coupled to the range finding module, the position identifying module, the inertia sensing module and the positioning unit. The range finding module detects the distance between the portable electronic device and a target to generate a measurement signal corresponding to the distance. The position identifying module senses a relative position of the target to generate an azimuth angle corresponding to the relative position. The inertia sensing module detects movement of the portable electronic device to generate an inertial signal corresponding to the movement. The positioning unit obtains positioning information. The processing unit not only receives and converts the measurement signal into a distance data but also receives and converting the inertial signal into a tilt angle. Then, the processing unit calculates coordinate difference information with the tilt angle, distance data and azimuth angle and calculates the coordinate position of the target with the positioning information and coordinate difference information.

In an embodiment, a method for measuring a coordinate position, comprising the steps of: detecting a distance between a portable electronic device and a target to generate a measurement signal corresponding to the distance; sensing a relative position of the target to generate an azimuth angle corresponding to the relative position; detecting movement of the portable electronic device to generate an inertial signal corresponding to the movement and obtaining a positioning information of the portable electronic device; converting the measurement signal into a distance data; converting the inertial signal into a tilt angle; calculating a coordinate difference information with the tilt angle, distance data and azimuth angle; and calculating a coordinate position of the target with the positioning information and the coordinate difference information.

In conclusion, the portable electronic device using the method for measuring a coordinate position according to any one of the embodiments can carry out non-contact positioning with the range finding module, position identifying module, inertia sensing module and positioning unit and thus can position targets without users showing up at locations of interest or coming into contact with the targets.

DETAILED DESCRIPTION OF THE EMBODIMENTS

Figure 1:
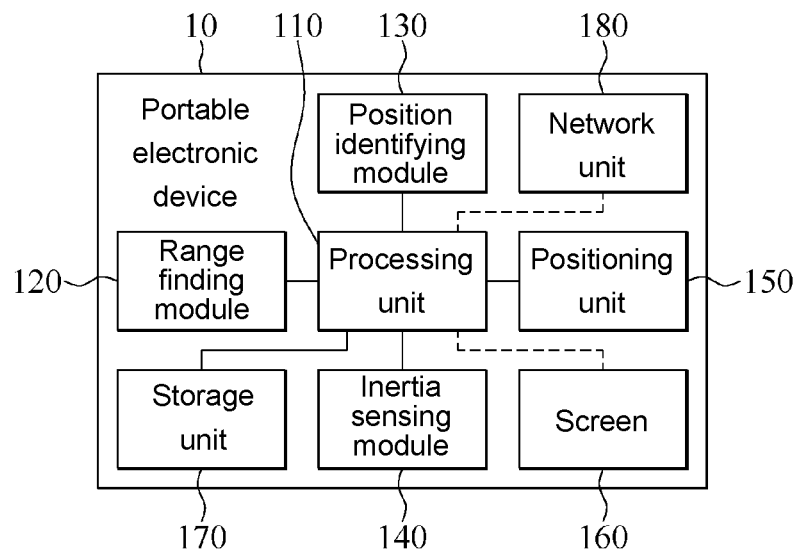
FIG. 1 is a block diagram of a portable electronic device according to an embodiment.

Referring to FIG. 1, a portable electronic device 10 comprises a processing unit 110, a range finding module 120, a position identifying module 130, an inertia sensing module 140 and a positioning unit 150. The processing unit 110 is coupled to the range finding module 120, the position identifying module 130, the inertia sensing module 140 and the positioning unit 150. In FIG. 1, optional components are indicated by dashed lines.

Figure 2:
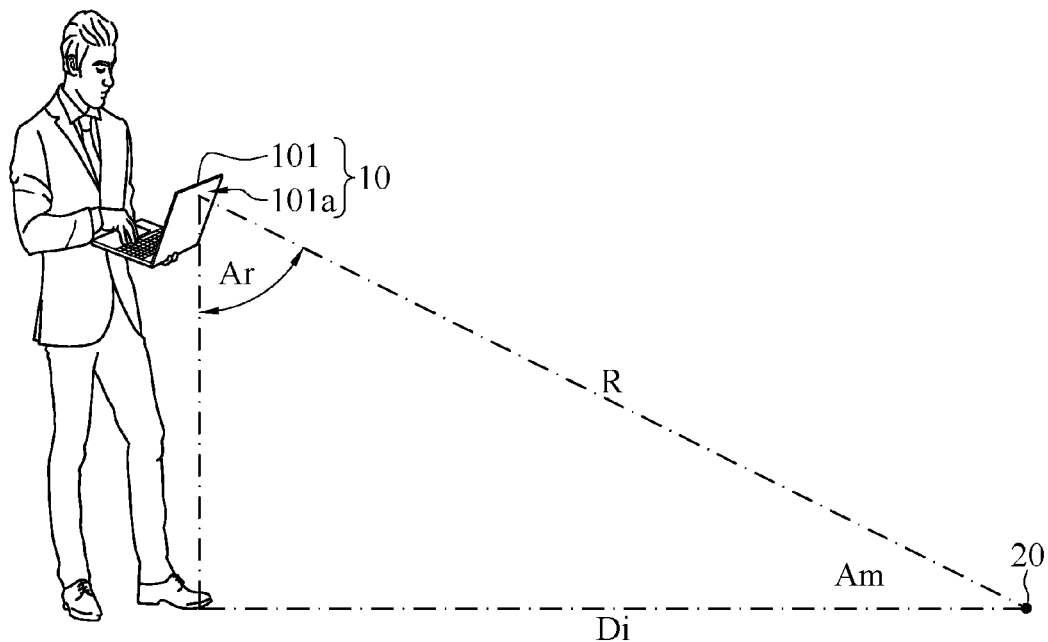
FIG. 2 is a schematic view of how to operate the portable electronic device of FIG. 1.

Referring to FIG. 1 and FIG. 2, the range finding module 120 is fitted to a casing 101 of the portable electronic device 10. A detection surface of the range finding module 120 is fitted inside an opening 101a on the casing 101 of the portable electronic device 10 to facilitate detection.

Figure 3:
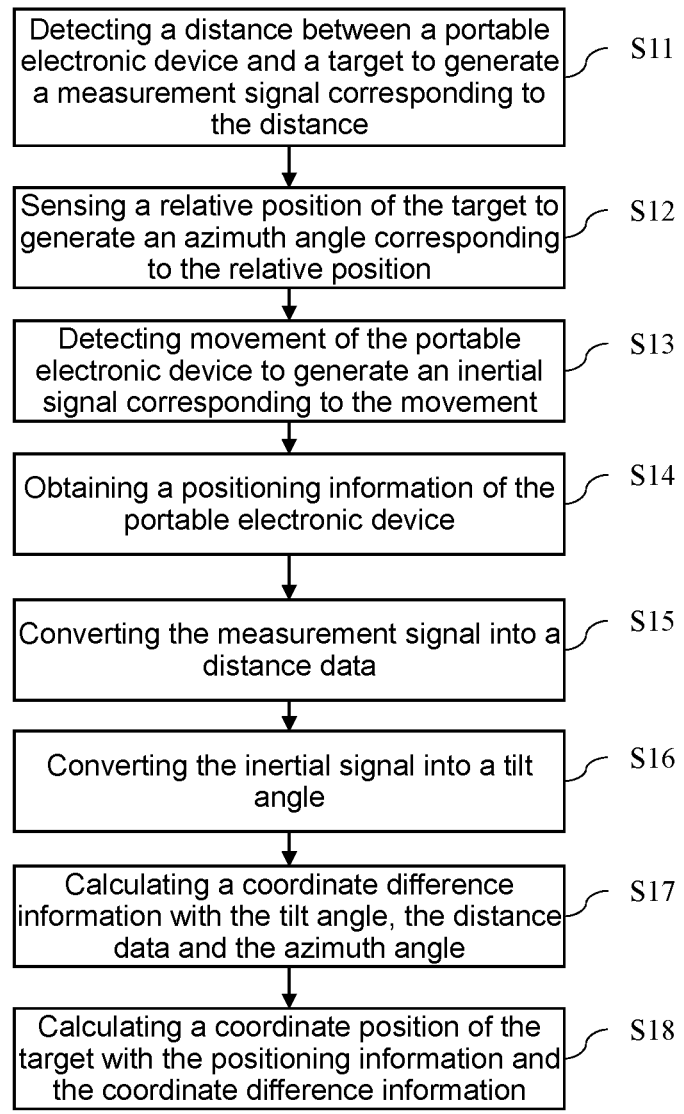
FIG. 3 is a schematic view of a process flow of a method for measuring a coordinate position according to an embodiment.

Referring to FIG. 1 through FIG. 3, to obtain a coordinate position of a target 20, the opening 101a on the casing 101 of the portable electronic device 10 faces the target 20 and thus allows the range finding module 120 to detect the distance between the portable electronic device 10 and the target 20, so as to generate the measurement signal accordingly (step S11).

Figure 4:
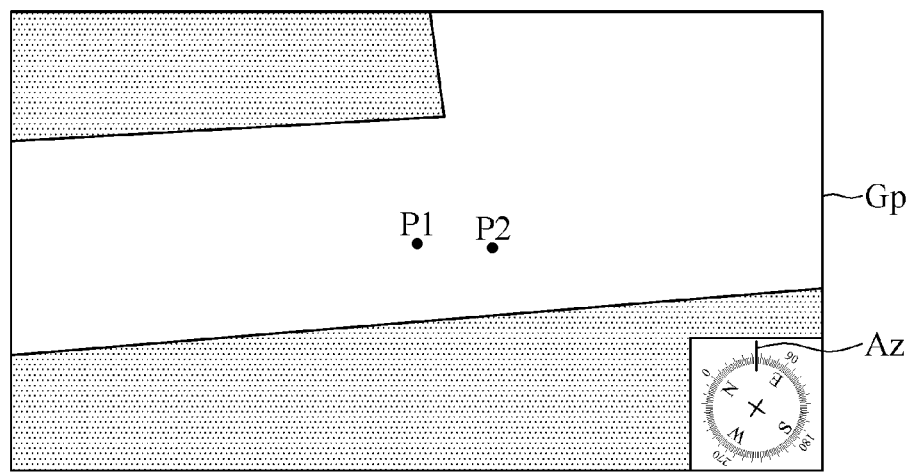
FIG. 4 is a schematic view of an e-map marked according to an embodiment.

The position identifying module 130 senses the relative position of the target 20 to generate an azimuth angle Az accordingly (step S12), as shown in FIG. 4. Thus, the portable electronic device 10 is informed of the position of the target 20 relative to the portable electronic device 10.

The inertia sensing module 140 detects movement of the portable electronic device 10 to generate an inertial signal corresponding to the movement (step S13). Thus, the portable electronic device 10 is informed of the measurement angles required for the range finding module 120, the position identifying module 130 and the inertia sensing module 140 to measure the target 20.

The positioning unit 150 obtains current positioning information P1 of the portable electronic device 10 (step S14), as shown in FIG. 4.

The processing unit 110 obtains the measurement signal, the azimuth angle Az, the inertial signal and the positioning information P1 from the range finding module 120, the position identifying module 130, the inertia sensing module 140 and the positioning unit 150, respectively. Then, the processing unit 110 receives and converts the measurement signal into a distance data R (step S15) and converts the inertial signal into a tilt angle Ar (step S16).

Next, the processing unit 110 calculates coordinate difference information with the tilt angle Ar, the distance data R and the azimuth angle Az (step S17) and calculates coordinate position P2 of the target 20 with the positioning information P1 and the coordinate difference information (step S18), as shown in FIG. 4.

Although the aforesaid steps are described in sequence, the sequence is not restrictive of the present disclosure. Persons skilled in the art understand that some of the aforesaid steps may occur simultaneously or reversely as appropriate.

According to some embodiments, in step S17, the processing unit 110 calculates planar distance Di with the tilt angle Ar and the distance data R and calculates the coordinate difference information with the planar distance Di and the azimuth angle Az. The planar distance Di is the linear distance between the portable electronic device 10 and the target 20 when projected vertically onto a projection plane.

For instance, the positioning information P1 comprises a first longitude and a first latitude, whereas the coordinate difference information comprises a longitude difference and a latitude difference. The processing unit 110 calculates the coordinate difference information with equations 1, 2, 3 and 4.

$$Am=\pi(0-Ar)/180 \quad \text{equation 1}$$

$$Di=R\times\cos(Am) \quad \text{equation 2}$$

$$\Delta lng=Di\times\sin(Az)/Ce\times\cos(\text{red}(\text{Lat-}o)) \quad \text{equation 3}$$

$$\Delta lat=Di\times\cos(Az)/Ce \quad \text{equation 4}$$

where Am denotes an angle of the target 20 between distance data R and the ground, π denotes the ratio of the circumference of a circle to its diameter, Ar denotes tilt angle, R denotes the distance data, Az denotes an azimuth angle, Ce denotes the length of an arc of 1 degree on the Earth's surface, Lat-o denotes the first latitude, Δlng denotes the longitude difference, and Δlat denotes the latitude difference. Ce is a constant and is expressed in kilometers (km). The distance data R is expressed in centimeters (cm). The azimuth angle Az is measured in degrees.

In some embodiments, the Ce is 111.320° or 111.199°.

Referring to the aforesaid example, the coordinate position P2 comprises a second longitude and a second latitude. The processing unit 110 calculates a coordinate position with equations 5, 6 below, $$Lng\text{-}f=Lng\text{-}o+\Delta lng \quad \text{equation 5}$$

$$Lat\text{-}f=Lat\text{-}o+\Delta lat \quad \text{equation 6}$$

where Lng-o denotes the first longitude, Lng-f denotes the second longitude, and Lat-f denotes the second latitude.

For instance, the positioning information P1 is 25° 03'16.2582"N and 121° 36'41.1392"E. Thus, owing to distance detection carried out with the range finding module 120, position sensing carried out with the position identifying module 130, and movement detection carried out with the inertia sensing module 140, the processing unit 110 obtains the distance data R of 47 cm, the azimuth angle Az of 123°, and the tilt angle Ar of 67°. Then, given these, the processing unit 110 calculates the coordinate position P2 to be 25° 3'16.2498"N and 121° 36'42.1532"E.

In some embodiments, the range finding module 120 is a laser range finding module, an infrared range finding module or an ultrasonic range finding module. For instance, when the range finding module 120 is a laser range finding module, step S11 requires the laser range finding module to emit a laser beam to the target 20 and receive from the target 20 a reflection light beam generated by the target 20 reflecting the laser beam, so as to generate the measurement signal. The laser range finding module converts the received reflection light beam into an electrical signal corresponding to the energy of the reflection light beam and subtracts an electrical signal corresponding to the energy of the laser beam and the electrical signal corresponding to the energy of the reflection light beam from each other to generate their difference signal (i.e., measurement signal). In another exemplary embodiment, when the range finding module 120 is an infrared range finding module, step S11 requires the infrared range finding module to emit an infrared light beam to the target 20 and receive from the target 20 a reflection light beam generated by the target 20 reflecting the infrared light beam, so as to generate a measurement signal corresponding to the energy difference therebetween. In another exemplary embodiment, when the range finding module 120 is an ultrasonic range finding module, step S11 requires the laser range finding module to emit an output sound wave to the target 20 and receive a reflection sound wave generated by the target 20 reflecting the output sound wave, so as to generate a measurement signal corresponding to the energy difference therebetween.

In some embodiments, the position identifying module 130 is an electronic compass. In step S12, the electronic compass detects directions of the Earth's magnetic field in order to determine the position which the portable electronic device 10 faces, i.e., the position of the target 20 relative to the portable electronic device 10, thereby generating the angle by which the portable electronic device 10 rotates relative to the Earth's magnetic field, i.e., the azimuth angle Az.

In some embodiments, the inertia sensing module 140 is a gyroscope or an accelerometer. For instance, the inertia sensing module 140 is a 3-axis accelerometer. Therefore, in step S13, the 3-axis accelerometer detects a tilt state of the portable electronic device 10 (the portable electronic device 10 enters the tilt state because of the movement of the portable electronic device 10) and thus generates x-axis acceleration, y-axis acceleration and z-axis acceleration which together express the tilt state. The range finding module 120 and 3-axis accelerometer (i.e., inertia sensing module 140) are disposed at the same block inside the casing 101 of the portable electronic device 10. In step S15, the processing unit 110 obtains the axial acceleration (i.e., inertial signal) perpendicular to the surface of the casing 101 with the opening 101a for use in the distance detection carried out by the range finding module 120 and converts the obtained acceleration into the tilt angle Ar. When z-axis is perpendicular to the surface of the casing 101 with the opening 101a, the processing unit 110 obtains the z-axis acceleration generated by the 3-axis accelerometer and converts it into the tilt angle Ar. The tilt angle is calculated according to the inertial signal, using a conversion algorithm well known among persons skilled in the art.

In some embodiments, the positioning unit 150 is a global positioning system (GPS).

Referring to FIG. 1 and FIG. 4, in some embodiment, the processing unit 110 marks an e-map Gp with the obtained positioning information P1 of the portable electronic device 10 and the obtained coordinate position P2 of the target 20 and displays the marked e-map Gp on a screen 160.

In some embodiments, the processing unit 110 also shows the azimuth angle Az on the screen 160 to inform users of the portable electronic device 10 of the position of the target 20 relative to the portable electronic device 10. In an exemplary embodiment, the processing unit 110 marks a window (not shown) with the azimuth angle Az and then displays the marked window on the screen 160. In another exemplary embodiment, the processing unit 110 marks the e-map Gp with the azimuth angle Az, the positioning information P1 and the coordinate position P2, and displays the marked e-map Gp on the screen 160, as shown in FIG. 4.

In some embodiments, the processing unit 110 is a microprocessor, microcontroller, digital signal processor, central processing unit, programmable logic controller, state machine, logic circuit, analog circuit, digital circuit, or any analog and/or digital device capable of processing signals according to operation instructions.

In some embodiments, the portable electronic device 10 further has a storage unit 170 (shown in FIG. 1). The storage unit 170 stores the aforesaid operation-oriented programs and stores transiently signals or data (for example, the positioning information P1, the distance data R, the azimuth angle Az, the tilt angle Ar, the coordinate difference information and the coordinate position P2) generated in the course of execution of the aforesaid operation-oriented programs. The storage unit 170 is a memory card or memory of any type and is not restricted of the present disclosure in terms of types. The storage unit 170 is built-in in the processing unit 110 or is disposed outside the processing unit 110 and coupled to the processing unit 110.

In some embodiments, the portable electronic device 10 further has a network unit 180 (shown in FIG. 1). The network unit 180 is internally coupled to the processing unit 110 and externally connected to a cloud server via a network, so as to upload the obtained coordinate position P2 of the target 20 to the cloud server. In some embodiments, the network unit 180 is a wireless network module, for example, WIFI, 3G, 4G, and 5G.

In some embodiments, after step S16, the processing unit 110 uploads the obtained positioning information P1, the distance data R, the azimuth angle Az and the tilt angle Ar to the cloud server with the network unit 180, for computation by the cloud server. The cloud server computes the coordinate difference information with the tilt angle Ar, the distance data R and the azimuth angle Az (step S17) and computes the coordinate position P2 of the target 20 with the positioning information P1 and coordinate difference information (step S18). Then, the cloud server sends the resultant coordinate position P2 back to the portable electronic device 10 (i.e., the processing unit 110 receives, with the network unit 180, the coordinate position P2 from the cloud server).

In conclusion, the portable electronic device 10 using the method for measuring a coordinate position according to any one of the embodiments can carry out non-contact positioning with the range finding module 120, the position identifying module 130, the inertia sensing module 140 and the positioning unit 150 and thus can position the target 20 without users showing up at locations of interest or coming into contact with the target 20.

What is claimed is:

1. A portable electronic device, comprising:
   a range finding module for directly detecting a distance between the portable electronic device and a target to generate a measurement signal corresponding to the distance;
   a position identifying module for sensing a relative position of the target to generate an azimuth angle corresponding to the relative position;
   an inertia sensing module for detecting movement of the portable electronic device to generate an inertial signal corresponding to the movement;
   a positioning unit for obtaining a positioning information of the portable electronic device; and
   a processing unit coupled to the range finding module, the position identifying module, the inertia sensing module and the positioning unit, and adapted to not only receive and convert the measurement signal into a distance data but also receive and convert the inertial signal into a tilt angle, wherein the processing unit is further adapted to calculate an angle of the target between the distance data and a ground based on the tilt angle, calculate a planar distance based on the distance data and the angle, calculate a coordinate difference information with the planar distance and the azimuth angle, and calculate a coordinate position of the target with the positioning information and the coordinate difference information.

2. The portable electronic device of claim 1, wherein the processing unit calculates a planar distance with the tilt angle and the distance data and calculates the coordinate difference information with the planar distance and the azimuth angle.

3. The portable electronic device of claim 1, wherein the range finding module is a laser range finding module, an infrared range finding module or an ultrasonic range finding module.

4. The portable electronic device of claim 1, wherein the position identifying module is an electronic compass.

5. The portable electronic device of claim 1, wherein the positioning unit is a global positioning system (GPS).

6. The portable electronic device of claim 1, wherein the inertia sensing module is a gyroscope or an accelerometer.

7. A portable electronic device, comprising:
   a range finding module for directly detecting a distance between the portable electronic device and a target to generate a measurement signal corresponding to the distance;
   a position identifying module for sensing a relative position of the target to generate an azimuth angle corresponding to the relative position;
   an inertia sensing module for detecting movement of the portable electronic device to generate an inertial signal corresponding to the movement;
   a positioning unit for obtaining a positioning information; and
   a processing unit coupled to the range finding module, the position identifying module, the inertia sensing module and the positioning unit, and adapted to not only receive and convert the measurement signal into a distance data but also receive and convert the inertial signal into a tilt angle, calculate a coordinate difference information with the tilt angle, the distance data and the azimuth angle, and calculate a coordinate position of the target with the positioning information and the coordinate difference information;
   wherein the positioning information comprises a first longitude and a first latitude, whereas the coordinate difference information comprises a longitude difference and a latitude difference, and the processing unit calculates the coordinate difference information with equations below, $$Am = \pi(0 - Ar)/180;$$

$$Di = R \times \cos(Am);$$

$$\Delta\text{lng} = Di \times \sin(Az)/Ce \times \cos(\text{red}(\text{Lat-}o)); \text{ and}$$

$$\Delta\text{lat} = Di \times \cos(Az)/Ce;$$

where $\pi$ is the ratio of the circumference of a circle to its diameter, Ar denotes the tilt angle, R denotes the distance data, Az denotes the azimuth angle, Ce denotes the length of an arc of 1 degree on the Earth's surface, Lat-o denotes the first latitude, Δlng denotes the longitude difference, and Δlat denotes the latitude difference.

8. The portable electronic device of claim 7, wherein the coordinate position comprises a second longitude and a second latitude, and the processing unit calculates the coordinate position with equations below, $$\text{Lng-}f = \text{Lng-}o + \Delta\text{lng};$$

$$\text{Lat-}f = \text{Lat-}o + \Delta\text{lat};$$

where Lng-o denotes the first longitude, Lng-f denotes the second longitude, and Lat-f denotes the second latitude.

9. A method for measuring a coordinate position, comprising the steps of:
  directly detecting a distance between a portable electronic device and a target to generate a measurement signal corresponding to the distance;
  sensing a relative position of the target to generate an azimuth angle corresponding to the relative position;
  detecting movement of the portable electronic device to generate an inertial signal corresponding to the movement;
  obtaining a positioning information of the portable electronic device;
  converting the measurement signal into a distance data;
  converting the inertial signal into a tilt angle;
  calculating an angle of the target between the distance data and a ground based on the tilt angle;
  calculating a planar distance based on the distance data and the angle;
  calculating a coordinate difference information with the tilt angle, the distance data the planar distance and the azimuth angle; and
  calculating a coordinate position of the target with the positioning information and the coordinate difference information.

10. The method of claim 9, wherein the step of calculating the coordinate difference information with the tilt angle, the distance data and the azimuth angle comprises calculating a planar distance with the tilt angle and the distance data and calculating the coordinate difference information with the planar distance and the azimuth angle.

11. The method of claim 9, wherein the positioning information comprises a first longitude and a first latitude, whereas the coordinate difference information comprises a longitude difference and a latitude difference, and the step of calculating the coordinate difference information with the distance data and the azimuth angle comprises calculating the coordinate difference information with equations below, $$Am = \pi(0 - Ar)/180;$$

$$Di = R \times \cos(Am);$$

$$\Delta\text{lng} = Di \times \sin(Az)/Ce \times \cos(\text{red}(\text{Lat-}o)); \text{ and}$$

$$\Delta\text{lat} = Di \times \cos(Az)/Ce;$$

where $\pi$ is the ratio of the circumference of a circle to its diameter, Ar denotes the tilt angle, R denotes the distance data, Az denotes the azimuth angle, Ce denotes the length of an arc of 1 degree on the Earth's surface, Lat-o denotes the first latitude, Along denotes the longitude difference, and Δlat denotes the latitude difference.

12. The method of claim 11, wherein the coordinate position comprises a second longitude and a second latitude, and the step of calculating the coordinate position of the target with the positioning information and the coordinate difference information comprises calculating the coordinate position with equations below, $$\text{Lng-}f = \text{Lng-}o + \Delta\text{lng};$$

$$\text{Lat-}f = \text{Lat-}o + \Delta\text{lat};$$

where Long-o denotes the first longitude, Long-f denotes the second longitude, and Lat-f denotes the second latitude.

* * * * *